United States Patent
Wang et al.

(10) Patent No.: US 6,498,210 B1
(45) Date of Patent: Dec. 24, 2002

(54) SILYLATED POLYURETHANES FOR ADHESIVES AND SEALANTS WITH IMPROVED MECHANICAL PROPERTIES

(75) Inventors: Xiaobin Wang, North Andover, MA (US); Scott D. Kubish, Saline, MI (US); Brian J. Briddell, Jackson, MI (US)

(73) Assignee: Adco Products, Inc., Michigan Center, MI (US)

( * ) Notice: Subject to any disclaimer, the term of this patent is extended or adjusted under 35 U.S.C. 154(b) by 0 days.

(21) Appl. No.: 09/615,921

(22) Filed: Jul. 13, 2000

(51) Int. Cl.[7] .................. L08L 83/10; L08G 77/458
(52) U.S. Cl. .................. 524/588; 528/17; 528/25; 528/28; 528/38; 528/905; 156/329; 156/331.1; 156/331.7
(58) Field of Search .................. 528/17, 25, 28, 528/38, 905; 524/588; 156/329, 331.1, 331.7

(56) References Cited

U.S. PATENT DOCUMENTS

| | | | |
|---|---|---|---|
| 3,627,722 A | 12/1971 | Seiter | |
| 3,632,557 A | 1/1972 | Brode et al. | |
| 3,979,344 A | 9/1976 | Bryant et al. | |
| 4,222,925 A | 9/1980 | Bryant et al. | |
| 4,374,237 A * | 2/1983 | Berger et al. | 528/28 |
| 4,474,933 A * | 10/1984 | Huber et al. | 528/26 |
| 4,567,228 A | 1/1986 | Gaa et al. | |
| 4,582,873 A | 4/1986 | Gaa et al. | |
| 4,798,878 A | 1/1989 | Brinkmann et al. | |
| 4,889,903 A | 12/1989 | Baghdachi | |
| 4,894,426 A | 1/1990 | Baghdachi et al. | |
| 4,954,598 A | 9/1990 | Baghdachi et al. | |
| 5,097,053 A | 3/1992 | Baghdachi et al. | |
| 5,147,927 A | 9/1992 | Baghdachi et al. | |
| 5,225,512 A | 7/1993 | Baghdachi et al. | |
| 5,272,224 A | 12/1993 | Baghdachi et al. | |
| 5,288,797 A | 2/1994 | Khalil et al. | |
| 5,363,994 A | 11/1994 | Angeline | |
| 5,368,943 A | 11/1994 | Baghdachi et al. | |
| 5,464,888 A | 11/1995 | Owen | |
| 5,476,889 A | 12/1995 | Owen | |
| 5,539,045 A | 7/1996 | Potts et al. | |
| 5,554,709 A | 9/1996 | Emmerling et al. | |
| 6,001,214 A * | 12/1999 | Hsieh et al. | 156/329 |
| 6,096,823 A * | 8/2000 | Shaffer | 524/590 |
| 6,281,322 B1 * | 8/2001 | Groth et al. | 528/28 |

OTHER PUBLICATIONS

Feng et al., "Silylated Urethane Polymers Enhance Properties of Construction Sealants", in Adhesvies Ages OSi Specialities, Inc., Apr. 1995.

* cited by examiner

Primary Examiner—Robert Dawson
Assistant Examiner—Jeffrey B. Robertson
(74) Attorney, Agent, or Firm—Kilworth, Gottman, Hagan & Schaeff, L.L.P.

(57) ABSTRACT

The silylated polyurethane polymer includes a polyurethane prepolymer having between greater than about 50 to about 95% of NCO groups terminated with silane capping agents. The polymer has an improved mechanical properties. The polymer can also have between about 5% to less than about 50% of the NCO groups terminated with low molecular weight terminators.

71 Claims, No Drawings

SILYLATED POLYURETHANES FOR ADHESIVES AND SEALANTS WITH IMPROVED MECHANICAL PROPERTIES

BACKGROUND OF THE INVENTION

This invention relates generally to silylated polyurethane polymers, and more particularly to silane-terminated polyurethane polymers with improved mechanical properties, to silane- and low molecular weight terminator-terminated polyurethane polymers, to sealant compositions containing such polymers, and to methods of making them.

Generally, conventional urethane-based adhesives and sealants have better physical properties, including tensile strength, elongation, and tear strength, than do adhesives and sealants made with silylated polyurethane capped with common capping agents such as aminotrimethoxysilanes and isocyanatotrimethoxysilanes. This makes it difficult to use silylated polyurethane-based adhesives and sealants in some applications, despite other advantages that they have over urethane-based products.

There are currently two approaches used to improve the mechanical properties of silylated polyurethanes. One solution has been to cap the polyurethane completely using difunctional silanes as capping agents. However, the cure rate of adhesives and sealants made with this type of silylated polyurethane decreases unacceptably in some cases. The other approach is to cap the polyurethane completely using certain special capping agents which reduce the cross-linking density. These include silanes having the general formulation

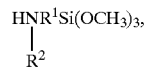

such as N-phenyl-gamma-aminopropyltrimethoxysilane. These special silanes are costly to use because of their high prices and high molecular weights, and the improvement in properties they provide is limited.

U.S. Pat. No. 3,627,722 (Seiter) discloses a partially capped polyurethane sealant composition. Seiter states that between 5 and 50% of the NCO groups should be capped. According to Seiter, capping more than 50% of the NCO groups produces a soft polymer with less cohesive strength than when less than 50% are capped.

Therefore, there is a need for economical silylated polyurethanes with improved mechanical properties for use in adhesives and sealants.

DESCRIPTION OF THE INVENTION

This need is met by the present invention which provides a novel silylated polyurethane polymer having improved mechanical properties which can be used in sealant compositions, and a method of making the same.

The silylated polyurethane polymer includes a polyurethane pre-polymer having between greater than about 50 to about 95% of the NCO groups terminated with silane groups. The polymer has improved mechanical properties, including tensile strength, elongation, and tear strength. The polymer can also have between about 5% to less than about 50% of the NCO groups terminated with low molecular weight terminators. Low molecular weight terminators include an active hydrogen which can react with the NCO groups.

The silane groups are preferably selected from

where R represents a divalent organic moiety, $R^1$ represents a $C_{1-6}$ alkyl group, and $R^2$ represents hydrogen, a $C_{1-6}$ organic moiety, or a second $RSi(OR^1)_3$ which may be the same as or different from the first such group.

The low molecular weight terminators have groups preferably selected from functional end groups except NCO groups, and inert end groups. The inert end groups are preferably selected from

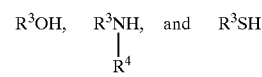

where $R^3$ represents an organic moiety whose molecular weight is less than 1000, and $R^4$ represents hydrogen or $R^3$. The molecular weight of $R^3$ is more preferably less than 100, and $R^3$ is most preferably a methyl, ethyl, or propyl group.

The functional end groups are preferably selected from

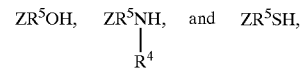

where $R^4$ represents hydrogen or an organic moiety whose molecular weight is less than 1000, $R^5$ represents a divalent organic moiety, and Z represents any functional group except NCO groups. The molecular weight of $R^4$ is more preferably less than 100, and most preferably $R^4$ is a methyl, ethyl, or propyl group.

Z is preferably selected from

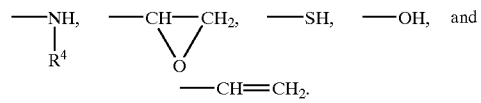

where $R^4$ represents hydrogen or an organic moiety whose molecular weight is less than 1000, and more preferably less than 100. $R^4$ is most preferably a methyl, ethyl, or propyl group.

Another aspect of the invention are sealant and adhesive compositions including the silylated polyurethane polymer as described above. The sealant and adhesive compositions will typically include additional compounds, such as fillers, reinforcing agents, solvents, catalysts, rheology modifiers, ultraviolet light screening compounds, and adhesion promoters.

Another aspect of the invention is a method of making the silylated polyurethane polymer described above. The method includes reacting a polyurethane prepolymer having NCO groups with silane capping agents so that between greater than about 50 to about 95% of the NCO groups are terminated with silane groups. The method optionally includes reacting the polyurethane prepolymer with a low molecular weight terminator so that between about 5 to less than about 50% of the NCO groups are terminated with low molecular weight terminators.

Preparation of isocyanate terminated urethane prepolymers, and silylated polyurethane with silane capping agents, are well known in the art. See, e.g., U.S. Pat. Nos. 3,627,722, 3,632,557, 3,979,344, and 4,222,925, which are incorporated herein by reference. Curing of the polymer results from hydrolysis of the silane end groups and condensation of Si—OH moieties.

In the present invention, a majority of NCO groups are capped with common silane capping agents. The remaining NCO groups are either left unreacted, or are capped with low molecular weight terminators. The low molecular weight terminators can form inert end groups or introduce different functional groups into the silylated polyurethane.

Between greater than about 50 to 95%, preferably between about 80 to about 95%, of the NCO groups can be capped with common suitable silane capping agents. There can be between about 5 to less than about 50%, preferably about 5 to about 20% uncapped NCO groups. The percentage of capped NCO groups depends on the chemical structure of the isocyanate terminated urethane prepolymer. That is, it depends on factors including the type of raw materials, such as toluene diisocyanate ("TDI") or diphenyl-methane diisocyanate ("MDI") and polyester polyols or polyether polyols, functionality, molecular weights, and also on the desired Suitable silanes include, but are not limited to, silanes having the following general formulas:

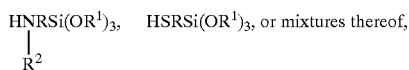

where R represents a divalent organic moiety, $R^1$ represents a $C_{1-6}$ alkyl group, and $R^2$ represents hydrogen, a $C_{1-6}$ organic moiety, or a second $RSi(OR^1)_3$ which may be the same as or different from the first such group.

The portion of the NCO groups which are not capped with the silane may optionally be capped with low molecular weight terminators. Generally, the low molecular weight terminators can be any substance containing hydrogen which will react with an NCO group. The low molecular weight terminators can form inert end groups or introduce desirable functional groups onto the polymers. Low molecular weight terminators which form inert end groups include, but are not limited to, the following:

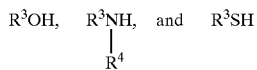

where $R^3$ represents an organic moiety whose molecular weight is less than 1000, preferably less than 100, and most preferably $R^3$ is a methyl, ethyl, or propyl group, and $R^4$ represents hydrogen or $R^3$. Low molecular weight terminators which can be used to introduce different functional groups include, but are not limited to,

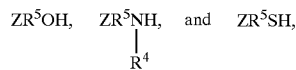

where $R^4$ represents hydrogen or an organic moiety whose molecular weight is less than 1000, $R^5$ represents a divalent organic moiety, and Z represents any functional group except NCO groups. The functional groups include, but are not limited to,

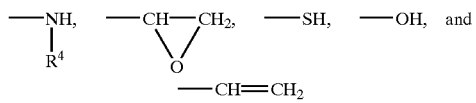

where $R^4$ represents hydrogen or an organic moiety whose molecular weight is less than 1000.

The silane capping agents and the low molecular weight terminators can be added together or separately. The sequence in which the reactants are added depends on their relative reactivity.

Adhesives and sealants made using the polyurethane prepolymers of the present invention will typically include fillers such as carbon black, and catalysts such as dibutyltin diacetate. Other fillers and catalysts can also be used. The adhesives and sealants can also contain additional components including adhesion promoters, rheology modifiers, and ultraviolet light screening compounds, and other components if desired.

In order that the invention may be more readily understood, reference is made to the following non-limiting examples.

EXAMPLE 1

A Partially Capped Silylated Polyurethane 1179.58 g of 2000 molecular weight polyether diol (PPG-2200 from ARCO Chemical Company), 123.14 g of TDI (80/20 isomer mixture) and 96.41 g of anhydrous toluene were charged. The reaction was carried out at 140° F. in the presence of 0.58 g of dibutyltin diacetate (METACURE® T-1 from Air Products and Chemical, Inc.) and 0.29 g of acetic acid under anhydrous condition. When the NCO percentage dropped to 0.708 in about 2 hours, 36.58 g of gamma-aminopropyltrimethoxysilane (Silquest® A-1110 from OSi) was added after the temperature had been cooled down to 110° F. Then, the NCO percentage dropped to 0.106 in about 15 min. This partially capped silylated polyurethane had 15% uncapped NCO groups.

EXAMPLE 2

A Silylated Polyurethane Fully Capped with a Silane Capping Agent and a Low Molecular Weight Terminator 1179.58 g of 2000 molecular weight polyether diol (PPG-2200 from ARCO Chemical Company), 123.14 g of TDI (80/20 isomer mixture) and 96.41 g of anhydrous toluene were charged. The reaction was carried out at 140° F. in the presence of 0.58 g of dibutyltin diacetate (METACURE® T-1 from Air Products and Chemical, Inc.) and 0.29 g of acetic acid under anhydrous condition. When the NCO percentage dropped to 0.708 in about 2 hours, 36.58 g of gamma-aminopropyltrimethoxysilane (Silquest® A-1110 from OSi) and 1.12 g of methanol were added when the temperature had been cooled down to 110° F. Then, the NCO percentage dropped to zero in less than 30 min. The reaction was done.

EXAMPLE 3

Comparison of Properties of Adhesives Made with the Silylated Polyurethane of Example 2 and a Silylated Polyurethane Fully Capped with Silquest® A-1110

Adhesives were made using the silylated polyurethane of Example 2 and a silylated polyurethane fully capped with Silquest® A-1110. The only difference between these two silylated polyurethanes is the capping agent. The adhesive formulation is as follows:

Adhesive Formula

| Ingredient | Part by wt. |
|---|---|
| Silylated polyurethane | 634.14 |
| Carbon black[a] | 300.00 |
| Methanol, anhydrous | 57.00 |
| Dibutyltin diacetate[b] | 1.00 |
| Neoalkoxy, tri(Nethylaminoethylamino) titanate[c] | 3.36 |
| N-beta-(Aminoethyl)-gamma-aminopropyltrimethoxysilane[d] | 4.50 |

[a]Regal 300R from Cabot Corporation
[b]METACURE ® T-1 from Air Products and Chemical, Inc.
[c]KEN-REACT ® Lica 44U
[d]Silquest ® A-1120

Comparison of Properties of Silylated Polyurethane Adhesives

| Property | Adhesive A[a] | Adhesive B[b] |
|---|---|---|
| Tack-free time @23° C./50% RH, min. | 12 | 12 |
| Cure rate @23° C./50% RH, in/24 h | 0.24 | 0.24 |
| Tensile strength @ break, PSI[c] | 1400 | 1000 |
| Tear strength, PLI[c] | 207 | 150 |
| Elongation @ break, %[c] | 400 | 200 |
| Hardness, Shore A | 60 | 72 |
| Adhesion to glass w/o primer | 100% CF[d] | 100% CF[d] |

[a]Adhesive A was made with the silylated polyurethane of Example 2.
[b]Adhesive B was made with the silylated polyurethane which was prepared from identical prepolymer in Example 2 but fully capped with Silquest ® A-1110.
[c]Samples were cured for 6 days in 23° C./50% RH environment chamber.
[d]CF stands for cohesive failure.

The silylated polyurethane of Example 2 (fully capped with a silane capping agent and a low molecular weight terminator) had improved tensile strength, tear strength, and elongation as compared to the silylated polyurethane fully capped with a silane capping agent. The tack-free time and the cure rate for the two adhesives are the same. Thus, the silylated polyurethane of the present invention provides improved properties without sacrificing cure rate. In addition, the present invention makes silylated polyurethane more tailorable and offers more flexibility to formulate adhesives and sealants. Furthermore, the cost of making this type of silylated polyurethane can be lower than that of normal silylated polyurethane.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:
1. A silylated polyurethane polymer comprising:
   a polyurethane prepolymer having between greater than about 80 to about 95% of NCO groups terminated with silane capping agents, the polyurethane prepolymer being cured to form the silylated polyurethane polymer and the silylated polyurethane polymer having improved mechanical properties.
2. The silylated polyurethane polymer of claim 1 wherein the silane capping agents are selected from

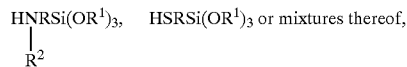

where R represents a divalent organic moiety,
   $R^1$ represents a $C_{1-6}$ alkyl group,
   $R^2$ represents hydrogen or $C_{1-6}$ organic moiety or a second $RSi(OR^1)_3$ which may be the same as or different from a first $RSi(OR^1)_3$ group in the silane capping agent.
3. The silylated polyurethane polymer of claim 1 wherein between about 5% to less than about 20% of the NCO groups are terminated with low molecular weight terminators, wherein the low molecular weight terminators include an active hydrogen which reacts with the NCO groups to terminate the NCO groups with the low molecular weight terminators.
4. The silylated polyurethane polymer of claim 3 wherein the low molecular weight terminators have a group selected from functional end groups except NCO groups and inert end groups.
5. The silylated polyurethane polymer of claim 4 wherein the low molecular weight terminators having inert end groups are selected from

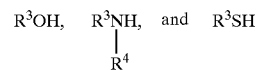

where $R^3$ represents an organic moiety whose molecular weight is less than 1000, and
   $R^4$ represents hydrogen of $R^3$.
6. The silylated polyurethane polymer of claim 5 wherein the molecular weight of $R^3$ is less than 100.
7. The silylated polyurethane polymer of claim 5 wherein $R^3$ is selected from methyl, ethyl, and propyl.
8. The silylated polyurethane polymer of claim 4 wherein the low molecular weight terminators having functional end groups are selected from

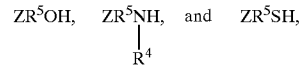

where $R^4$ represents hydrogen or an organic moiety whose molecular weight is less than 1000,
   $R^5$ represents a divalent organic moiety, and
   Z represents any functional group except NCO groups.
9. The silylated polyurethane polymer of claim 8 wherein the molecular weight of $R^4$ is less than 100.
10. The silylated polyurethane polymer of claim 8 wherein $R^4$ is selected from methyl, ethyl, and propyl.
11. The silylated polyurethane polymer of claim 8 wherein Z is selected from

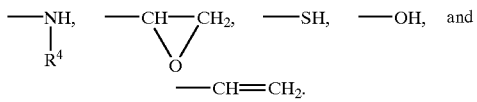

where $R^4$ represents hydrogen or an organic moiety whose molecular weight is less than 1000.
12. The silylated polyurethane polymer of claim 11 wherein the molecular weight of $R^4$ is less than 100.
13. The silylated polyurethane polymer of claim 11 wherein $R^4$ is selected from methyl, ethyl, and propyl.

14. A sealant composition comprising:

a polyurethane prepolymer having between greater than about 50 to about 95% of NCO groups terminated with silane capping agents and sufficient filler to form a thixotropic paste, the polyurethane prepolymer being cured to form the silylated polyurethane polymer and the sealant composition having improved mechanical properties;

wherein the silane capping agents comprise $HSRSi(OR^1)_3$ where R represents a divalent organic moiety, and $R^1$ represents a $C_{1-6}$ alkyl group.

15. A sealant composition comprising:

a polyurethane prepolymer having between greater than about 80 to about 95% of NCO groups terminated with silane capping agents; and sufficient filler to form a thixotropic paste, the polyurethane prepolymer being cured to form the silylated polyurethane polymer and the sealant composition having improved mechanical properties.

16. The sealant composition of claim 15 wherein the silane capping agents are selected from

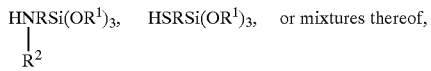

where R represents a divalent organic moiety, $R^1$ represents a $C_{1-6}$ alkyl group, $R^2$ represents hydrogen or $C_{1-6}$ organic moiety or a second $RSi(OR^1)_3$ which may be the same as or different from a first $RSi(OR^1)_3$ group in the silane capping agent.

17. The sealant composition of claim 15 wherein between about 5% to less than about 20% of the NCO groups are tented with low molecular weight terminators, wherein the low molecular weight terminators include an active hydrogen which reacts with the NCO groups to terminate the NCO groups with the low molecular weight terminators.

18. The sealant composition of claim 17 wherein the low molecular weight terminators have a group selected from functional end groups except NCO groups and inert end groups.

19. The sealant composition of claim 18 wherein the low molecular weight terminators having inert end groups are selected from

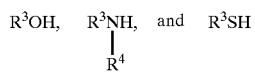

where $R^3$ represents an organic moiety whose molecular weight is less than 1000, and $R^4$ represents hydrogen or $R^3$.

20. The sealant composition of claim 19 wherein the molecular weight of $R^3$ is less than 100.

21. The sealant composition of claim 19 wherein $R^3$ is selected from methyl, ethyl, and propyl.

22. The sealant composition of claim 18 wherein the low molecular weight terminators having functional end groups are selected from

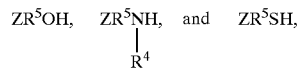

where $R^4$ represents hydrogen or an organic moiety whose molecular weight is less than 1000, $R^5$ represents a divalent organic moiety, and Z represents any functional group except NCO groups.

23. The sealant composition of claim 22 wherein the molecular weight of $R^4$ is less than 100.

24. The sealant composition of claim 22 wherein $R^4$ is selected from methyl, ethyl, and propyl.

25. The sealant composition of claim 22 wherein Z is selected from

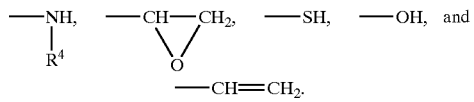

where $R^4$ represents hydrogen or an organic moiety whose molecular weight is less than 1000.

26. The sealant composition of claim 25 wherein the molecular weight of $R^4$ is less than 100.

27. The sealant composition of claim 25 wherein $R^4$ is selected from methyl, ethyl, and propyl.

28. The sealant composition of claim 14 wherein the polyurethane prepolymer has between about 80 to about 95% of NCO groups terminated with silane capping agents.

29. A silylated polyurethane polymer comprising:

a polyurethane prepolymer having between greater than about 50 to about 95% of NCO groups terminated with silane capping agents and between about 5% to less than about 50% of NCO groups terminated with low molecular weight terminators having functional end groups except NCO groups and inert end groups, the polyurethane prepolymer being cured to form the silylated polyurethane polymer;

wherein the silane capping agents are selected from

where

R represents a divalent organic moiety, $R^1$ represents a $C_{1-6}$ alkyl group, $R^2$ represents hydrogen or $C_{1-6}$ organic moiety or a second $RSi(OR^1)_3$ which may be the same as or different from a first $RSi(OR^1)_3$ group in the silane capping agent; and wherein the low molecular weight terminators having inert end groups are selected from

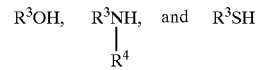

where $R^3$ represents an organic moiety whose molecular weight is less than 1000, and $R^4$ represents hydrogen or $R^3$ or the low molecular weight terminators having functional end groups are selected from $ZR^5OH$, $ZR^5NH$, and $ZR^5SH$,
  |
  $R^4$ where $R^4$ represents hydrogen or an organic moiety whose molecular weight is less than 1000, $R^5$ represents a divalent organic moiety, and Z represents any fuictional group except NCO groups.

30. The silylated polyurethane polymer of claim 29 wherein the molecular weight of $R^3$ is less than 100.

31. The silylated polyurethane polymer of claim 29 wherein $R^3$ is selected from methyl, ethyl, and propyl.

32. The silylated polyurethane polymer of claim 29 wherein the molecular weight of $R^4$ is less than 100.

33. The silylated polyurethane polymer of claim 29 wherein $R^4$ is selected from methyl, ethyl, and propyl.

34. The silylated polyurethane polymer of claim 29 wherein between about 80% to about 95% of the terminations are made with the silane capping agents and between about 5% to about 20% of the terminations are made with the low molecular weight terminators.

35. A method of making a silyated polyurethane polymer comprising:
  reacting a polyurethane prepolymer having NCO groups with silane capping agents so that between greater than about 80 to about 95% of the NCO groups with silane capping agents.

36. The method of claim 35 wherein the silane capping agents are selected from $HNRSi(OR^1)_3$, $HSRSi(OR^1)_3$, or mixtures thereof,
  |
  $R^2$ where R represents a divalent organic moiety, $R^1$ represents a $C_{1-6}$ alkyl group, $R^2$ represents a $C_{1-6}$ organic moiety or a second RSi $(OR^1)_3$ which may be the same as or different from a first $RSi(OR^1)_3$ group in the silane capping agent.

37. The method of claim 35 further comprising reacting the polyurethane prepolymer with low molecular weight terminators, wherein the low molecular weight terminators include an active hydrogen which can react with the NCO groups so that between about 5 to less than about 20% of the NCO groups are terminated with low molecular weight terminators.

38. The method of claim 37 wherein the low molecular weight terminators have a group selected from functional end groups except NCO groups and inert end groups.

39. The method of claim 38 wherein the low molecular weight terminators having inert end groups are selected from $R^3OH$, $R^3NH$, and $R^3SH$
  |
  $R^4$ where $R^3$ represents an organic moiety whose molecular weight is less than 1000, and $R^4$ represents hydrogen or $R^3$.

40. The method of claim 37 wherein the low molecular weight terminators having functional end groups are selected from $ZR^5OH$, $ZR^5NH$, and $ZR^5SH$,
  |
  $R^4$ where $R^4$ represents hydrogen or an organic moiety whose molecular weight is less than 1000, $R^5$ represents a divalent organic moiety, and Z represents any functional group except NCO groups.

41. The method of claim 40 wherein Z is selected from

—NH, —CH—CH$_2$, —SH, —OH, and
  |        \ /
  $R^4$      O

—CH=CH$_2$.

where $R^4$ represents hydrogen or an organic moiety whose molecular weight is less than 1000.

42. A method of making a silylated polyurethane polymer comprising:
  reacting a polyurethane prepolymer having NCO groups with silane capping agents so that between greater than about 50 to about 95% of the NCO groups are terminated with silane capping agents, wherein the silane capping agents comprise $HSRSi(OR^1)_3$
  where R represents a divalent organic moiety, and
  $R^1$ represents a C1-6 alkyl group.

43. An adhesive composition comprising:
  a silylated polyurethane polymer comprising a polyurethane prepolymer having between greater than about 50 to about 95% of NCO groups terminated with silane capping agents, the polyurethane prepolymer being cured to form the silylated polyurethane polymer and the silylated polyurethane polymer having improved mechanical properties;
  a filler, and
  a catalyst;
  wherein the silane capping agents comprise $HSRSi(OR^1)_3$
  where R represents a divalent organic moiety, and
  $R^1$ represents a $C_{1-6}$ alkyl group.

44. An adhesive composition comprising:
  a silylated polyurethane polymer comprising a polyurethane prepolymer having between greater thin about 80 to about 95% of NCO groups terminated with silane capping agents, the polyurethane prepolymer being cured to form the silylated polyurethane polymer and the silylated polyurethane polymer having improved mechanical properties;
  a filler; and
  a catalyst.

45. The adhesive composition of claim 44 wherein the silane capping agents are selected from $HNRSi(OR^1)_3$, $HSRSi(OR^1)_3$, or mixtures thereof,
  |
  $R^2$ where R represents a divalent organic moiety, $R^1$ represents a $C_{1-6}$ alkyl group, R2 represents hydrogen or $C_{1-6}$ organic moiety or a second $RSi(OR^1)_3$ which may be the same as or different from a first $RSi(OR^1)_3$ group in the silane capping agent.

46. The adhesive composition of claim 44 wherein between about 5% to less than about 20% of the NCO groups are terminated with low molecular weight terminators, wherein the low molecular weight terminators include an active hydrogen which reacts with the NCO groups to terminate the NCO groups with the low molecular weight terminators.

47. The adhesive composition of claim 46 wherein the low molecular weight terminators have a group selected from functional end groups except NCO groups and inert end groups.

48. The adhesive composition of claim 47 wherein the low molecular weight terminators having inert end groups are selected from

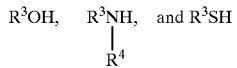

where $R^3$ represents an organic moiety whose molecular weight is less than 1000, and $R^4$ represents hydrogen or $R^3$.

49. The silylated polyurethane polymer of claim 48 wherein the molecular weight of $R^3$ is less than 100.

50. The adhesive composition of claim 48 wherein $R^3$ is selected from methyl, ethyl, and propyl.

51. The adhesive composition of claim 47 wherein the low molecular weight terminators having functional end groups are selected from

where $R^4$ represents hydrogen or an organic moiety whose molecular weight is less than 1000, $R^5$ represents a divalent organic moiety, and Z represents any functional group except NCO groups.

52. The adhesive composition of claim 51 wherein the molecular weight of $R^4$ is less than 100.

53. The adhesive composition of claim 51 wherein $R^4$ is selected from methyl, ethyl, and propyl.

54. The adhesive composition of claim 51 wherein Z is selected from

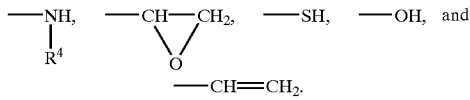

where $R^4$ represents hydrogen or an organic moiety whose molecular weight is less than 1000.

55. The adhesive composition of claim 54 wherein the molecular weight of $R^4$ is less than 100.

56. The adhesive composition of claim 54 wherein $R^4$ is selected from methyl, ethyl, and propyl.

57. The adhesive composition of claim 43 wherein the polyurethane prepolymer has between about 80 to 95% of NCO groups terminated with silane capping agents.

58. A silylated polyurethane polymer comprising:
a polyurethane prepolymer having between greater than about 50 to about 95% of NCO groups terminated with silane capping agents, the polyurethane prepolymer being cured to form the silylated polyurethane polymer and the silylated polyurethane polymer having improved mechanical properties;
wherein the silane capping agent comprises $HSRSi(OR^1)_3$ where R represents a divalent organic moiety, and $R^1$ represents a $C_{1-6}$ alkyl group.

59. The silylated polyurethane polymer of claims 58 wherein the polyurethane prepolymer has between about 80 to about 95% of NCO groups terminated with silane capping agents.

60. The silylated polyurethane polymer of claim 58 wherein between about 5% to less than about 50% of the NCO groups are terminated with low molecular weight terminators, wherein the low molecular weight terminators include an active hydrogen which reacts with the NCO groups to terminate the NCO groups with the low molecular weight terminators.

61. The silylated polyurethane polymer of claim 60 wherein the low molecular weight terminators have a group selected from functional end groups except NCO groups and inert end groups.

62. The silylated polyurethane polymer of claim 61 wherein the low molecular weight terminators having inert end groups are selected from

where $R^3$ represents an organic moiety whose molecular weight is less than 1000, and $R^4$ represents hydrogen or $R^3$.

63. The silylated polyurethane polymer of claim 62 wherein the molecular weight of $R^3$ is less than 100.

64. The silylated polyurethane polymer of claim 62 wherein $R^3$ is selected from methyl, ethyl, and propyl.

65. The silylated polyurethane polymer of claim 61 wherein the low molecular weight terminators having functional end groups are selected from

where $R^4$ represents hydrogen or an organic moiety whose molecular weight is less than 1000, $R^5$ represents a divalent organic moiety, and Z represents any functional group except NCO groups.

66. The silylated polyurethane polymer of claim 65 wherein the molecular weight of $R^4$ is less than 100.

67. The silylated polyurethane polymer of claim 65 wherein $R^4$ is selected from methyl, ethyl, and propyl.

68. The silylated polyurethane polymer of claim 65 wherein Z is selected from

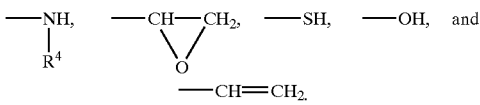

where $R^4$ represents hydrogen or an organic moiety whose molecular weight is less than 1000.

69. The silylated polyurethane polymer of claim 68 wherein the molecular weight of $R^4$ is less than 100.

70. The silylated polyurethane polymer of claim 68 wherein $R^4$ is selected from methyl, ethyl, and propyl.

71. The method of claim 42 wherein between about 80 to about 95% of the NCO groups are terminated with silane capping agents.

* * * * *

UNITED STATES PATENT AND TRADEMARK OFFICE
CERTIFICATE OF CORRECTION

PATENT NO. : 6,498,210 B1
DATED : December 24, 2002
INVENTOR(S) : Xiaobin Wang, Scott D. Kubish and Brian J. Briddel It is certified that error appears in the above-identified patent and that said Letters Patent is hereby corrected as shown below:

Column 6,
Line 32, "$R^4$ represents hydrogen of $R^3$." should be -- $R^4$ represents hydrogen or $R^3$. --;

Column 7,
Line 11, "$HSRSi(OR^1)3$" should be -- $HSRSi(OR^1)_3$ --;
Line 40, "NCO groups are tented with low" should be -- NCO groups are terminated with low --;

Column 9,
Line 10, "Z represents any fuictional group" should be -- Z represents any functional group --;
Line 30, "NCO groups with silane capping agents" should be -- NCO groups are terminated with silane capping agents --;
Line 41, "$R^2$ represents a $C_{1-6}$ organic moiety" should be -- $R^2$ represents hydrogen or $C_{1-6}$ organic moiety --;

Column 10,
Line 28, "$R^1$ represents a C1-6 alkyl group." should be -- $R^1$ represents a $C_{1-6}$ alkyl group. --;
Line 37, "a filler, and" should be -- a filler; and --;
Line 45, "greater thin about 80" should be -- greater than about 80 --;
Line 56, "$HSRSi(OR^1)_3$," should be -- $HSRSi(OR^1)_3$ --;
Line 62, "R2 represents" should be -- $R^2$ represents --;

Column 12,
Line 1, "claims 58" should be -- claim 58 --.

Signed and Sealed this

Twenty-ninth Day of April, 2003

JAMES E. ROGAN
*Director of the United States Patent and Trademark Office*